United States Patent [19]

Kato et al.

[11] 4,081,510

[45] Mar. 28, 1978

[54] PROCESS FOR CATALYTICALLY TREATING AN EXHAUST GAS CONTAINING AMMONIA GAS AND OXYGEN GAS TO REDUCE SAID AMMONIA GAS TO NITROGEN

[75] Inventors: Akira Kato; Shimpei Matsuda; Shigeo Uno; Jinichi Imahashi; Fumito Nakajima, all of Hitachi, Japan

[73] Assignee: Hitachi, Ltd., Japan

[21] Appl. No.: 731,929

[22] Filed: Oct. 13, 1976

[30] Foreign Application Priority Data

Oct. 15, 1975 Japan .............................. 50-123248
Dec. 5, 1975 Japan .............................. 50-144002

[51] Int. Cl.² .............................................. C01C 3/00
[52] U.S. Cl. .................................... 423/237; 252/469; 423/351
[58] Field of Search ................... 423/235, 351, 237; 252/469, 475

[56] References Cited

U.S. PATENT DOCUMENTS

| | | | |
|---|---|---|---|
| 2,801,898 | 8/1957 | Marcus | 423/237 |
| 3,467,491 | 9/1969 | Hardison | 423/237 |
| 3,812,236 | 5/1974 | Adams et al. | 423/237 |
| 3,970,739 | 7/1976 | Shiraishi et al. | 423/237 |
| 4,003,978 | 1/1977 | Shiraishi et al. | 423/237 |
| 4,010,238 | 3/1977 | Shiraishi et al. | 423/351 |

FOREIGN PATENT DOCUMENTS

| | | | |
|---|---|---|---|
| 1,957,317 | 5/1971 | Germany | 423/351 |
| 2,026,657 | 1/1972 | Germany | 423/351 |
| 1,000,772 | 8/1965 | United Kingdom | 423/237 |

*Primary Examiner*—O. R. Vertiz
*Assistant Examiner*—Eugene T. Wheelock
*Attorney, Agent, or Firm*—Craig & Antonelli

[57] ABSTRACT

A process for treating an exhaust gas containing substantially only ammonia gas and oxygen gas as reactants to decompose catalytically the ammonia gas to nitrogen and water, which comprises contacting at an elevated temperature the exhaust gas with a catalyst consisting essentially of the oxides of titanium, copper and a member selected from the group consisting of molybdenum, tungsten, vanadium, cerium, iron and mixtures thereof. The ammonia gas is catalytically decomposed in accord with the following chemical reaction:

$$2NH_3 + 3/2\, O_2 \rightarrow N_2 + 3H_2O$$

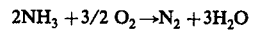

Air pollution due to ammonia gas contained in an exhaust gas from, such as, an ammonia production plant, or copying machines using ammonia sensitive paper, is satisfactorily prevented by this process.

19 Claims, 1 Drawing Figure

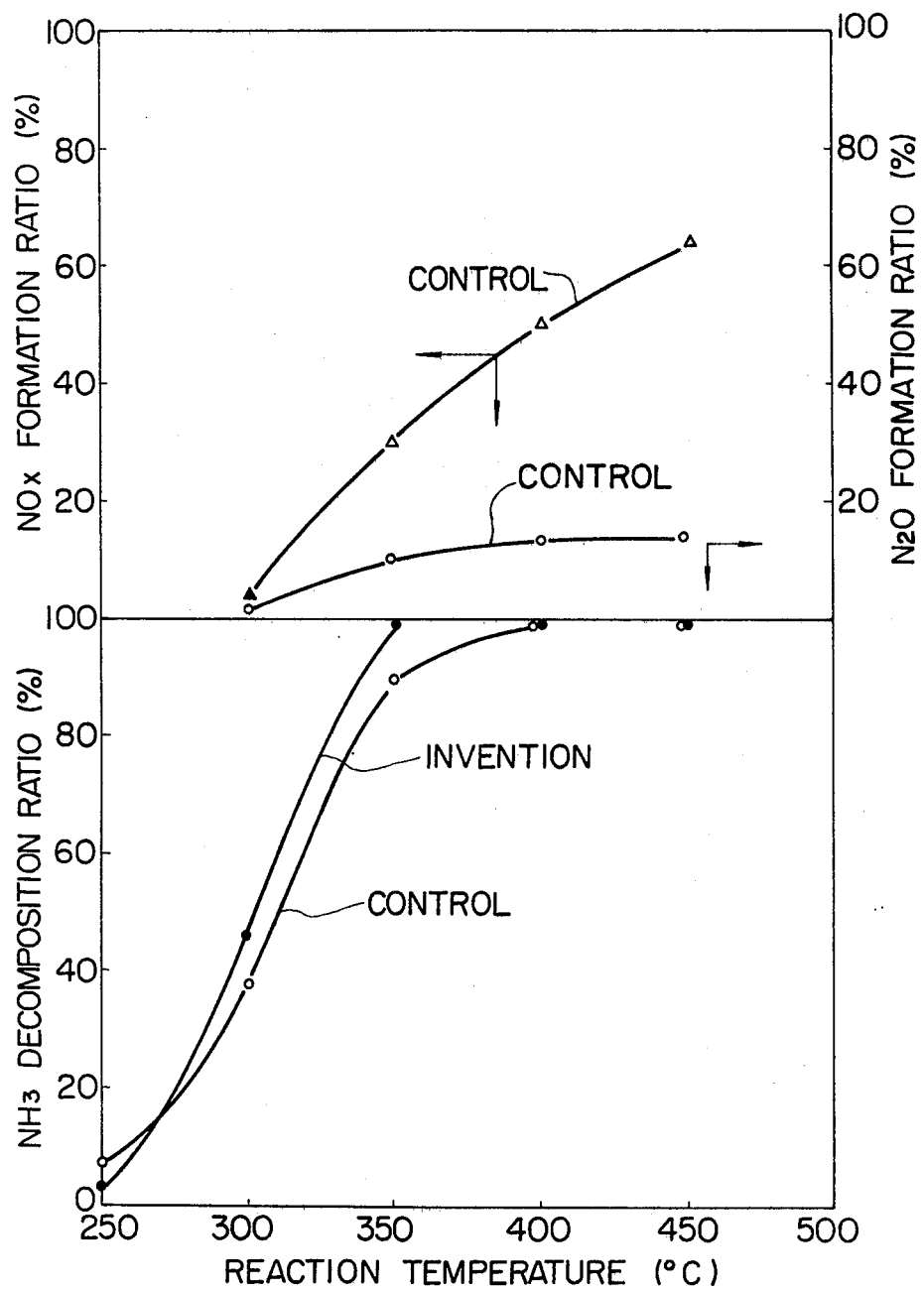

PROCESS FOR CATALYTICALLY TREATING AN EXHAUST GAS CONTAINING AMMONIA GAS AND OXYGEN GAS TO REDUCE SAID AMMONIA GAS TO NITROGEN

BACKGROUND OF THE INVENTION

The present invention relates to a process for treating an exhaust gas containing substantially only ammonia gas and oxygen as reactive components by contacting the exhaust gas with a specific catalyst which exhibits an activity for decomposition of ammonia at an elevated temperature.

An exhaust gas from, such as, an ammonia production plant, a copying machine using ammonia sensitive paper, a plant for removing nitrogen oxides in which ammonia gas is added to an exhaust gas from a boiler or nitric acid production plant, or the like, contains ammonia gas and oxygen. The ammonia gas contained in the exhaust gas can be a cause of air pollution. In the nitrogen oxide removing plant in which an excess amount of ammonia gas relative to an amount of nitrogen oxides in the exhaust gas is added to prevent completely leak of the nitrogen oxides in the exhaust gas from the plant. As a result, a small amount of ammonia gas is contained in a treated exhaust gas while no nitrogen oxide is contained therein. The leak of ammonia gas is not only a cause of air pollution, but also a cause of clogging of tubing of the plant because the ammonia gas reacts with acidic gases, such as $SO_3$, in the exhaust gas thereby forming ammonium salts.

As ammonia gas is easily absorbed in water, the ammonia gas has conventionally been removed by a liquid absorption method. However, this method may bring about a new problem because there is a necessity to treat the liquid that has absorbed the ammonia gas.

Accordingly, decomposition of ammonia gas to nitrogen and water is much better than the liquid absorption method. Heretofore, in a process for treating ammonia gas so as to oxidize the ammonia gas to nitrogen monoxide, platinum group catalysts or platinumrhodium series catalysts have been used at a temperature higher than 800° C. This process has a serious problem that the reaction product, i.e. nitrogen oxide, is harmful to human beings. The high reaction temperature of this process is not suitable for treating an exhaust gas because the exhaust gas to be treated must generally be heated up to such high temperature.

There have been known various catalysts for oxidizing ammonia which comprise, such as, oxides of cobalt, nickel, copper, bismuth and/or manganese. In this process using the oxides, nitrogen monoxide and nitrogen oxides are formed. Moreover, this process is difficult to effect at low temperatures of such as 300° to 400° C because of a low activity of the catalysts.

SUMMARY OF THE INVENTION

An object of the present invention is to provide a process for treating an exhaust gas containing substantially only ammonia gas and oxygen gas as reactive components with a catalyst at an elevated temperature whereby the ammonia gas is reacted with the oxygen gas to form nitrogen and water.

Another object of the present invention is to provide a process for treating an exhaust gas containing substantially only ammonia gas and oxygen gas as reactive components with a catalyst possessing an increased activity with respect to decomposition of ammonia. The present invention is based upon a discovery that ammonia gas can react with oxygen at relatively low temperature to form effectively nitrogen and water in the presence of a catalyst consisting essentially of oxides to titanium and copper. Activity of this catalyst is very high at relatively low temperatures such as 300° to 400° C, which has never been observed in other conventional catalysts used for the ammonia decomposition processes. According to one aspect of the present invention there is provided a process for treating an exhaust gas containing substantially only ammonia gas and oxygen gas as reactive components with a catalyst at an elevated temperature wherein the catalyst consists essentially of oxides of titanium and copper. According to another aspect of the present invention there is provided a process for treating the exhaust gas mentioned above which uses a catalyst consisting essentially of oxides of titanium, copper and a member selected from the group consisting of molybdenum, tungsten, vanadium, cerium, iron and mixtures thereof.

BRIEF DESCRIPTION OF THE DRAWING

The single FIGURE is a graph showing relationships between ammonia decomposition ratios and formation ratios of $NO_x$ and $N_2O$ and reaction temperatures.

DETAILED DESCRIPTION OF THE INVENTION

The co-pending application Ser. No. 531,304, filed Dec. 10, 1974, titled "Process for Reducing Nitrogen and Novel Catalyst Composition Useful Therefor" discloses that a catalyst consisting of oxides of titanium and copper is usable for reducing nitrogen oxides in an exhaust gas to nitrogen by catalytically reacting the nitrogen oxides with ammonia gas in the presence of oxygen in accordance with the following chemical reaction:

$$\tfrac{1}{2} O_2 + 2NO + 2NH_3 \rightarrow 2N_2 + 3H_2O \tag{1}$$

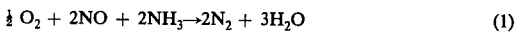

While the co-pending application disclesed a great number of catalysts, it has been found that when the present inventors investigated the catalytic properties of the titanium-copper catalysts, the catalysts had a good activity for decomposition of ammonia in the absence of nitrogen oxides. Then the inventors discovered the application of this catalytic feature to treatment of an exhaust gas containing no nitrogen oxides from, such as, an ammonia production plant, a nitrogen-oxide removing plant, copying machine using ammonia sensitive paper, or the like.

Although the mechanism of decomposition of ammonia in the presence of oxygen gas has not been elucidated, the present inventors speculated that the chemical reaction between the ammonia and oxygen gas may be expressed as follows:

$$4NH_3 + 3O_2 \rightarrow 2N_2 + 6H_2O \tag{2}$$

This chemical reaction is quite different from that in case of reduction of nitrogen oxides. As can be seen from the equation above, one mole of ammonia reacts with three quarters mole of oxygen thereby to produce nitrogen and water which are no longer harmful to human beings.

The catalysts used for the above-mentioned reaction contains the oxide of titanium and the oxide of copper as active components, and if needed, a proper amount of an oxide of a member of Mo, W, V, Ce, Fe or mixtures thereof may be contained. Investigations conducted by the inventors revealed that these catalysts not only have a good activity with respect to the reaction between ammonia and oxygen at relatively low temperatures but also have an advantage that they form no or little amount of nitrogen oxides ($NO_x$) during the reaction. Further, it has been found that a catalytic activity of these catalysts are only slightly deteriorated due to poisoning by minor amounts of sulfur oxide or sulfuric anhydride in an exhaust gas whereby the catalysts showed a good activity for a long period of time.

While the reaction temperatures may vary in accordance with the treating process and kinds of exhaust gases to be treated, the lower the reaction temperature, the more practical and economical the processes are. Preferably, the reaction temperatures range between about 300° and about 400° C in the present invention. When the reaction temperature is lower than about 300° C, a reaction speed becomes low, and as a result, in order to obtain a sufficient decomposition ratio of ammonia gas a space velocity of the exhaust gas in a catalytic reaction zone has to be lowered. This means that the volume of a gas treating plant becomes excessively large and the process and plant become less economical. When the reaction temperature exceeds about 400° C, nitrogen oxides in the treated gas tend to increase in their amount.

The space velocity based on the unit volume of gas per unit volume of catalyst may vary widely in accordance with components and composition of the exhaust gas and with other factors such as the reaction temperature, a gas pressure or reaction pressure, etc. When the temperature, which seems to be the most important factor, is within a range of about 300° C to about 400° C, a space velocity of about 1,000 to 100,000 $h^{-1}$ is proper to carry out efficiently the ammonia-oxygen reaction in the presence of the specific catalysts.

Preferably, within a space velocity in a range of about 2,000 to about 30,000 $h^{-1}$ ammonia gas can be efficiently decomposed by oxygen in the absence of nitrogen oxides.

When the space velocity is too small, the volume of the treating plant including the catalytic zone has to be excessively increased; when the space velocity exceeds about 100,000 $h^{-1}$, a considerable amount of unreacted ammonia gas may leak from the treating plant even if the reaction temperature is elevated to about 400° C.

A reaction pressure of a treated gas in a catalyst column may vary widely, but a pressure of one atmosphere to about 10 kg/$cm^2$ is a preferable range of the reaction pressure.

Since 3/4 mole of oxygen per one mole of ammonia is necessary to oxidize and decompose ammonia as is seen from the equation (2), more than 3/4 mole of oxygen per one mole of ammonia should be contained in an exhaust gas so that the reaction speed of ammonia and oxygen becomes sufficiently high and leak of unreacted ammonia is minimized. From the practical point of view, an amount of oxygen should be several times the amount of ammonia in the exhaust gas to be treated. If an exhaust gas does not contain a sufficient amount of oxygen, a proper amount of oxygen or air is introduced into the exhaust gas.

The catalysts used in the present invention contain titanium and copper and additional metals as active components in the form of oxides. Inventors speculate the form thereof may be a composite oxide.

Starting materials of titanium can be used in various forms, such as titanium dioxide, water soluble salts of titanium, rutile structure titania treated with hot concentrated sulfuric acid or anatase titania treated with hot concentrated sulfuric acid, whereby part or whole of the titanium oxide is dissolved in the sulfuric acid. Of these starting materials preferable are titanium oxide made from the salt and titanium oxide treated with the sulfuric acid. One important thing to be considered when these titanium oxides are used is that the titanium oxides should have a surface area as large as possible, preferably at least 20$m^2$/g whereby the titanium oxides exhibit a good catalytic activity. The surface area is determined by a BET method which is well known in the art. When the starting materials are titanium salts and a calcining temperature for making titanium oxide is lower than about 700° C, preferably about 400° C to 650° C, the resulting titanium oxide exhibits a good activity. Therefore, the catalyst used in the present invention should be prepared at a temperature not higher than about 700° C when pre-calcining and calcining the catalyst to avoid the lowering of the activity of titanium oxide. Pre-calcination and calcination steps are carried out in any kind of atmosphere, i.e. in an oxidation, reduction or inert gas atmosphere. When metal components are subjected to an operational condition, they are easily oxidized to metal oxides. The determination as to the surface area of the titanium oxide obtained by this method revealed that it had at least 20 $m^2$/g of a surface area. Another analysis of the resulting titanium oxide by this method showed that the titanium oxide had an n-type conductivity in terms of compound semiconductor.

The following are examples of starting materials of titanium oxide:

Titanium oxides; titanic acid ($TiO_2 \cdot nH_2O$) which is convertible into titanium oxide when heated; titanium tetrachloride; titanium sulfate; titanyl sulfate; organic titanium compounds such as titanium isopropoxide; and the like. When water soluble titanium compounds are used as a starting material, a precipitating agent such as ammonia solution, caustic soda, alkali metal carbonate, urea or the like is added to an aqueous solution of the compounds. Then the resulting precipitate is heated to decompose it to oxides.

Titanium compounds, preparation of the precipitate and other conditions are disclosed in the aforesaid co-pending application, Ser. No. 531,304.

Copper oxide is the other essential component. Starting materials for copper oxide are cuprous oxide, copper oxide, copper hydroxide, copper sulfate, copper nitrate, and copper chloride. Preparation of the precipitate and other conditions are disclosed in the co-pending application, Ser. No. 531,304.

In the present invention, an additional metal oxide is used which is selected from oxides of Mo, W, V, Ce, Fe and mixtures thereof. Examples of starting materials for the additional metal oxides are molybdenum oxides, ammonium molybdate, tungsten oxides, tungsten acids, ammonium paratungstate, tungsten silicate, vanadium oxides, ammonium metavanadate, vanadyl sulfate, iron oxides, iron hydroxides, iron nitrates, iron sulfates, iron chlorides, iron acetates, cerium oxides, cerium nitrates, cerium sulfates, cerium chlorides, cerium acetates, cerium carbonates, and cerium oxalates. Preparation of precipitates of the oxides and other conditions for preparation of catalysts are disclosed in the co-pending application Ser. No. 531,304.

One group of catalysts used in the present invention consists essentially of oxides of titanium and copper preferably in the range of 0.02 to 2 moles of copper per one mole of titanium. In order to obtain a high decomposition ratio of ammonia the above range is preferable so as to avoid an excessive increase in an amount of catalyst and volume of a gas treating plant. A more preferable range of copper is 0.05 to 1 mole per one mole of titanium. An optimum range therefor is 0.05 to 0.5 mole of copper per mole of titanium.

As is disclosed in the co-pending application, Ser. No. 531,304, the catalysts are prepared by such as a homogeneous solution method, or a co-precipitation method which are followed by a proper mixing method and calcining treatment. These catalysts are not supported on a carrier. But the catalysts supported on a suitable carrier such as alumina, silica, zirconia or the like are also useful in the present invention. In the catalysts of this type, a total amount of titanium and copper oxides should exceed 3% by weight of the whole weight of the catalyst including the carrier. Preferably, the amount of the active components should be at least 5% by weight including the carrier.

The amount of the additional components such as Mo, W, etc. should similarly be not larger than 0.5 mole of the metal or mixture of metals per one mole of titanium. Preferably, the amount of the additional metal component is in a range of 0.01 to 0.5 mole per one mole of titanium. An optimum range of the additional metal component is 0.02 to 0.5 mole per mole of titanium. When the catalyst contains the additional metal component, an operable reaction temperature for oxidizing and decomposing ammonia is made wider (i.e. 250° to 450° C) than in case of the catalyst containing no additional component. This fact also means that the ternary catalyst (Ti-Cu-Mo etc.) exhibits a higher catalytic activity than the binary catalyst (Ti-Cu) at relatively lower reaction temperatures.

For the purpose of illustrating the present invention shown are the following examples.

EXAMPLE 1

(1) Preparation of Ti-Cu catalyst

With 500 grams of metatitanate slurry (150 grams as $TiO_2$) mixed with 50 grams of copper nitrate (Cu($NO_3$)$_2$ . 3$H_2O$). 500 ml of distilled water was added to the resulting mixture, followed by kneading it by a kneader to obtain a paste like mixture. The paste was then pre-calcined at 300° C for 5 hours. Thereafter, 3% by weight of graphite was admixed with the pre-calcined paste to press-mold it under a pressure of 500 kg/cm$^2$, thereby to obtain columnar pellets of 6 mm diameter and 6 mm thickness. The resulting pellets were calcined at 500° C for 4 hours. The molar ratio of copper oxide to titanium oxide was 0.11 (i.e. $TiO_2$ : CuO = 9:1). The thus prepared catalyst material was ground to obtain a granular catalyst of 10 to 20 mesh.

(2) Treatment of Exhaust Gas

A glass tube having an inner diameter of 16 mm was packed with the granular catalyst to make a catalyst bed. The exhaust gas of the following composition was continuously passed through the catalyst bed. The catalyst bed was heated to different temperatures as shown in Table 1

| Gas Composition: | |
| --- | --- |
| $NH_3$ | 300 ppm |
| $O_2$ | 3% by volume |
| $N_2$ | balance |

The flow speed of the exhaust gas in the catalyst bed was 30,000 h$^{-1}$ in terms of space velocity being measured under an assumption that the glass tube containing the catalyst bed is at 0° C and atmosphere.

Ammonia decomposition ratios and $NO_x$ formation ratios at different temperatures are shown in Table 1 in which the decomposition ratio is expressed as:

Decomposition ratio(%) =
$$\frac{\text{Amount of fed ammonia} - \text{unreacted ammonia}}{\text{Amount of fed ammonia}} \times 100,$$

and the $NO_x$ formation ratio is expressed as:

$$\text{Formation ratio(\%)} = \frac{\text{Formed nitrogen oxides}}{\text{Fed ammonia}} \times 100.$$

Ammonia which leaks from the end of the tube as unreacted ammonia was measured by an indo-phenol method known as a method of detecting ammonia, and nitrogen oxide ($NO_x$) was measured by an analyzer of chemical luminescent.

Reaction temperatures were measured by a thermocouple inserted into the catalyst bed.

Table 1

| Reaction temperature (° C) | $NH_3$ Decomposition Ratio (%) | $NO_x$ Formation Ratio (%) |
| --- | --- | --- |
| 250 | <1 | 0 |
| 300 | 39 | 0 |
| 350 | 88 | 1 |
| 400 | 100 | 13 |
| 450 | 100 | 32 |

As is seen from Table 1, $NH_3$ was effectively decomposed at a temperature range of 350° to 450° C. When the reaction temperature is 450° C, $NO_x$ formation ratio becomes large; and when the reaction temperature is lower than 300° C, $NH_3$ decomposition ratios are considerably low. However, the results shown in Table 1 above do not mean that the catalyst used in this example is useless when a reaction temperature is lower than 300° or higher than 450° C, because the results shown were obtained only under the space velocity of 30,000 h$^{-1}$.

When the $NH_3$ decomposition ratio is unsatisfactory at a temperature lower than 300° C, the ratio can be increased by decreasing the space velocity. On the other hand, when the $NO_x$ formation ratio is too large at a temperature higher than 450° C, the ratio can be lowered by increasing the space velocity.

An analysis of nitrous oxide ($N_2O$) in the treated gas by an infrared absorption method showed that only several volume %'s of nitrous ocide were contained even at relatively high temperatures. Accordingly, the process using the $TiO_2$-CuO catalyst is advantageous to remove ammonia from an exhaust gas in the absence of nitrogen oxides.

Comparative Example 1

(1) Preparation of CuO-Al₂O₃ Catalyst 500 grams of aluminum nitrate (Al(NO$_3$)$_3$ · 9H$_2$O) and 37.6 grams of copper nitrate (Cu(NO$_3$)$_2$ · 3H$_2$O) were dissolved in one liter of water. To the resulting solution titrated gradually was a 1N Na$_2$CO$_3$ solution to co-precipitate aluminum hydroxide and copper hydroxide. The final pH of the solution containing the precipitate was adjusted to 7. The precipitate was washed with distilled water by decantation, and the washed precipitate was dried at 120° C for one day. To the dried product admixed was 3% by weight of graphite to mold it under a molding pressure of 500 kg/cm² thereby obtaining columnar pellets of 6 mm diameter and 6 mm thickness.

The thus obtained pellets were calcined at 500° C for 4 hours. The catalyst contained alumina and copper oxide in the ratio of 9 to 1. The catalyst was ground to produce a powdery catalyst of 10 to 20 mesh.

(2) Treatment of Exhaust Gas

The powdery catalyst was packed in the glass tube used in Example 1 and the ammonia-oxygen containing gas used in Example 1 was passed through the catalyst bed. The results that were measured in the same manner as in Example 1 are shown in Table 2 below.

Table 2

| Reaction Temperature (° C) | NH$_3$ Decomposition Ratio (%) | NO$_x$ Formation Ratio (%) |
| --- | --- | --- |
| 250 | <1 | 0 |
| 300 | 5 | 0 |
| 350 | 68 | 1 |
| 400 | 90 | 3 |
| 450 | 100 | 11 |

As can be seen from Table 1 and Table 2, the TiO$_2$/CuO (9:1) catalyst exhibits a higher catalytic activity than the Al$_2$O$_3$/CuO (9:1) catalyst at relatively lower temperatures.

EXAMPLE 2

(1) Preparation of TiO$_2$-CuO

In this example used were titanium tetrachloride and copper chloride as starting materials.

500 grams of titanium tetrachloride (TiCl$_4$) was dissolved in one liter of distilled water. Into this solution dissolved was 50 grams of copper chloride (CuCl$_2$ · 2H$_2$O). To the resulting solution titrated gradually was a 1N NaOH solution to co-precipitate titanium hydroxide and copper hydroxide. The final pH of the solution was adjusted to 7. The thus obtained precipitate was washed, dried and molded in the same manner as in Example 1 to obtain pellets. The pellets were calcined at 500° C for 4 hours. Ratio of titanium oxide to copper oxide in the pellets was 9:1. The pellets were then ground to obtain a granular catalyst of 10 to 20 mesh.

(2) Treatment of Exhaust Gas

The catalyst was used in the same manner as in Example 1, and results obtained are shown in Table 3 below.

Table 3

| Reaction Temperature (° C) | NH$_3$ Decomposition Ratio (%) | NO$_x$ Formation Ratio (%) |
| --- | --- | --- |
| 250 | <1 | 0 |
| 300 | 37 | 0 |
| 350 | 87 | 1 |
| 400 | 100 | 12 |
| 450 | 100 | 29 |

EXAMPLE 3

In this example titanium sulfate and copper sulfate were used as starting materials.

350 grams of titanium sulfate which contains 24% by weight in terms of Ti(SO$_4$)$_2$ was dissolved in one liter of distilled water. Into this solution dissolved was 9.7 grams of copper sulfate. To the solution titrated was a 1N NaOH solution to adjust pH to 7 thereby to obtain a co-precipitate of titanium hydroxide and copper hydroxide. The precipitate was subjected to the same process as in Example 1 to obtain a granular catalyst of 10 to 20 mesh and of a TiO$_2$ to CuO ratio of 9 to 1.

The results of treatment of the same exhaust gas as used in Example 1 are shown in Table 4 below.

Table 4

| Reaction Temperature (° C) | NH$_3$ Decomposition Ratio (%) | NO$_x$ Formation Ratio (%) |
| --- | --- | --- |
| 250 | <1 | 0 |
| 300 | 39 | 0 |
| 350 | 87 | 2 |
| 400 | 100 | 14 |
| 450 | 100 | 35 |

EXAMPLE 4

In this example used were anatase titanium oxide (TiO$_2$) and copper sulfate as starting materials.

100 grams of the anatase titanium oxide was thoroughly mixed with 250 grams of concentrated sulfuric acid. The resulting slurry was heated at about 200° C for 2 hours; then 34.7 grams of copper sulfate was added to the slurry. By titrating a 1N NaOH solution to the mixture the final pH of it was adjusted to about 8 thereby to obtain a precipitate.

The resulting precipitate was washed, dried, molded and calcined in the same manner as in Example 1 to obtain pellets. The ratio of TiO$_2$ to CuO in the pellets was 9 to 1. The pellets were then ground to obtain a granular catalyst of 10 to 20 mesh.

The results of gas treatment using the catalyst in the same manner as in Example 1 are shown in Table 5 below.

Table 5

| Reaction Temperature (° C) | NH$_3$ Decomposition Ratio (%) | NO$_x$ Formation Ratio (%) |
| --- | --- | --- |
| 250 | <1 | 0 |
| 300 | 36 | 0 |
| 350 | 85 | 1 |
| 400 | 100 | 10 |
| 450 | 100 | 26 |

EXAMPLE 5

In this carrier catalyst components are supported on an alumina carrier.

100 grams of titanium tetrachloride and 10 g of copper chloride (CuCl$_2$ · 2H$_2$O) were dissolved in distilled water. To this solution added was 182 grams of aluminum hydroxide powder. The mixture was neutralized by a 1N NaOH solution under stirring to precipitate titanate and copper hydroxide on aluminum hydroxide. After the product was sufficiently washed, it was filtered and dried at 120° C.

The dried product was used to produce a granular catalyst in the same manner as in Example 1 in which TiO$_2$ and CuO were supported on an alumina carried in the TiO$_2$/CuO molar ratio of 9:1. 25% by weight of the whole weight of the catalyst was titanium oxide and copper oxide.

The results of gas treatment using the catalyst in the same manners as in Example 1 are shown in Table 6 below.

Table 6

| Reaction Temperature (° C) | NH$_3$ Decomposition Ratio (%) | NO$_x$ Formation Ratio (%) |
|---|---|---|
| 250 | <1 | 0 |
| 300 | 31 | 0 |
| 350 | 77 | 1 |
| 400 | 90 | 7 |
| 450 | 100 | 16 |

EXAMPLE 6

In this example ratios of copper to titanium were changed as set forth in Table 7.

Except for the changing of the ratios the catalysts were prepared in the same manner as in Example 1 and gas treatment was carried out by using the catalyst in the same manner as in Example 1.

Results obtained in this experiment are shown in Table 7.

Table 7

| Ti/Cu Molar Ratio | Left Column: NH$_3$ Decomposition Ratio(%); Right Column; NO$_x$ Formation Ratio(%) | | | | | | | | | | | | | | | |
|---|---|---|---|---|---|---|---|---|---|---|---|---|---|---|---|---|
| Reaction Temperature (° C) | 1/0 | | 1/0.02 | | 1/0.05 | | 1/0.11 | | 1/0.43 | | 1/1 | | 1/2.33 | | 0/1 | |
| 250 | 0 | 0 | 0 | 0 | 0 | 0 | 0 | 0 | 0 | 0 | 0 | 0 | 0 | 0 | 0 | 0 |
| 300 | 0 | 0 | 26 | 0 | 35 | 0 | 39 | 0 | 38 | 0 | 35 | 0 | 28 | 0 | 7 | 0 |
| 350 | 10 | 0 | 75 | 1 | 85 | 1 | 88 | 1 | 87 | 2 | 85 | 2 | 79 | 2 | 37 | 0 |
| 400 | 33 | 2 | 90 | 8 | 100 | 12 | 100 | 13 | 100 | 14 | 100 | 13 | 94 | 12 | 75 | 6 |
| 450 | 69 | 9 | 98 | 30 | 100 | 34 | 100 | 37 | 100 | 38 | 100 | 36 | 100 | 34 | 93 | 21 |

From Table 7 it is apparent that when compared with the catalyst containing either titanium or copper as an active component the binary catalysts used in the present invention exhibit a better catalytic activity. Especially, the catalysts containing titanium and copper in the molar ratio of a range of 0.02 to 2.33 of copper to one mole of titanium, exhibit an excellent catalytic activity.

EXAMPLE 7

In this example the catalysts used in Example 1 was employed and the reaction temperature was kept constant at 350° C, while the space velocity was changed as shown in Table 8. Other conditions were the same as in Example 1.

Table 8

| SV, h$^{-1}$ | NH$_3$ Decomposition Ratio (%) | NO$_x$ Formation Ratio(%) |
|---|---|---|
| 5,000 | ca. 100 | 9 |
| 10,000 | 99 | 5 |
| 30,000 | 88 | 3 |
| 100,000 | 47 | 1 |

From Table 8 it will be apparent that the catalyst can be used over a very wide range of the space velocity.

EXAMPLE 8

100 grams of titanium oxide (anatase TiO$_2$) and 34.7 grams of copper sulfate were mixed with 100 ml of distilled water, and the resulting mixture was thoroughly kneaded to obtain a paste. The paste was precalcined at 300° C for 5 hours. Then 3% by weight of graphite was admixed. Then the mixture was molded, calcined and ground in the same manner as in Example 1 to obtain a granular catalyst. The ratio of TiO$_2$ to CuO was 9 to 1.

Gas treatment was carried out using the above catalyst in the same manner as in Example 1.

Table 9

| Reaction Temperature (° C) | NH$_3$ Decomposition Ratio (%) | NO$_x$ Formation Ratio (%) |
|---|---|---|
| 250 | <1 | 0 |
| 300 | 4 | 0 |
| 350 | 31 | 1 |
| 400 | 70 | 4 |
| 450 | 93 | 13 |

EXAMPLE 9

100 grams of anatase titanium oxide and 100 grams of copper oxide powder were used to prepare a catalyst in the same manner as in Example 8.

This catalyst was used to treat an exhaust gas in the same manner as in Example 1, and the results thereof are shown in Table 10.

Table 10

| Reaction Temperature (° C) | NH$_3$ Decomposition Ratio (%) | NO$_x$ Formation Ratio (%) |
|---|---|---|
| 250 | <1 | 0 |
| 300 | 3 | 0 |
| 350 | 30 | 1 |
| 400 | 69 | 3 |
| 450 | 92 | 10 |

From the results shown in Table 9 and Table 10 it will be apparent that the catalysts consisting of anatase titanium oxide and copper oxide exhibit a relatively low catalytic activity at low temperatures under the conditions set forth in Example 1. Therefore, such titanium oxides as being calcined at a temperature higher than about 700° C are not always useful for the present invention because such titanium oxides have a small surface area.

EXAMPLE 10

(1) Preparation of Catalyst Containing Oxides of Ti-Cu-Mo.

To 500 grams of metatitanate slurry mixed were 53.4 grams of copper nitrate (Cu(NO$_3$)$_2$ · 3H$_2$O) and 19.5 grams of ammonium molybdate ($(NH_4)_6 Mo_7O_{24} \cdot 4H_2O$).

500 ml of distilled water was added to the resulting mixture, and the mixture was kneaded thoroughly. The resulting paste mixture was pre-calcined at 300° C for 5 hours, and 3% by weight of graphite was added to the paste. The resulting paste mixture was molded under a pressure of about 500 kg/cm² to obtain pellets of 6 mm diameter and 6 mm thickness. The pellets were then calcined at 500° C for 4 hours to obtain a catalyst consisting of titanium oxide, copper oxide and molybdenum oxide in the molar ratio of 85:10:5 (i.e. 1:0.12:0.06). The pellets were ground to a 10 to 20 mesh granular catalyst.

The results obtained by using the Ti-Cu-Mo catalyst show that it exhibits high ammonia decomposition ratios but an amount of $NO_x$ and $N_2O$ formation does not appear in Figure, an amount of $NO_x$ being less than 1 ppm at 450° C and an amount of $N_2O$ being less than the minimum quantitative analysis amount (10 ppm).

EXAMPLE 11

Except for the changing of the ratio of titanium and copper, catalysts were prepared in the same manner as in Example 10 and gas treatment was conducted in the same manner as in Example 1. The results thereof are shown in Table 11.

Table 11

| Ti/Cu/Mo Molar ratio Reaction Temperature (° C) | Left Column: $NH_3$ Decomposition Ratio(%); Right Column; $NO_x$ Formation Ratio (%) | | | | | | | | | | | | | |
|---|---|---|---|---|---|---|---|---|---|---|---|---|---|---|
| | 1/0.11/0 | | 1/0.06/0.06 | | 1/0.11/0.01 | | 1/0.12/0.06 | | 1/0.07/0.36 | | 1/0.17/0.50 | | 1/0.05/0.50 | | 1/0/0.11 |
| 250 | 0 | 0 | 2 | 0 | 0 | 0 | 3 | 0 | 2 | 0 | 2 | 0 | 2 | 0 | 0 | 0 |
| 300 | 39 | 0 | 44 | 0 | 42 | 0 | 46 | 0 | 45 | 0 | 46 | 0 | 44 | 0 | 0 | 0 |
| 350 | 88 | 1 | 97 | 0 | 96 | 0 | 99 | 0 | 97 | 0 | 96 | 0 | 92 | 0 | 6 | 0 |
| 400 | 100 | 13 | 100 | 0 | 100 | 9 | 100 | 0 | 100 | 0 | 100 | 0 | 100 | 1 | 50 | 0 |
| 450 | 100 | 37 | 100 | 1 | 100 | 26 | 100 | 1 | 100 | 1 | 100 | 1 | 100 | 5 | 95 | 1 |

(2) Preparation of Pt-Al₂O₃ Catalyst (Control)

In order to compare catalytic properties of the above catalyst with those of a conventional $Pt-Al_2O_3$ catalyst, a $Pt-Al_2O_3$ catalyst was prepared in the following manner.

5 ml of an aqueous solution of hexachloroplatinate ($H_2PtCl_6$) which contains 10 grams of platinum per 100 grams of the solution was diluted with 65 ml of distilled water. 100 grams of an active alumina carrier of 10 to 20 mesh was impregnated with the solution. The impregnated carrier was dried at 120° C for 5 hours and then calcined in a hydrogen gas stream at 450° C for 3 hours. The carrier was 5% by weight of the total weight of the catalyst.

(3) The catalysts prepared in the manners (1) and (2) were separately filled in the reactor tube described in Example 1. Gas treatments were conducted in the same manner as in Example 1, and results thereof are shown in Figure, therein $N_2O$ Formation Ratio is represented as follows:

$$N_2O \text{ Formation Ratio (\%)} = \frac{\text{Formed } N_2O}{\text{Fed ammonia}} \times 100$$

As is seen from Figure, the $Pt-Al_2O_3$ catalyst exhibits a relatively good activity with respect to decomposition of ammonia but a considerable amount of $NO_x$ and $N_2O$ is formed.

It is apparent from Table 11 that as compared with the Ti/Cu (1:0.11) catalyst the Ti/Cu/Mo catalysts exhibit better ammonia decomposition activities and lower $NO_x$ formation ratios even at relatively high temperatures such as 450° C. Further, the Ti/Cu/Mo catalysts have better activites than the Ti/Mo (1:0.11) catalyst at low temperatures.

An analysis showed that in case of Ti/Cu/Mo catalysts $N_2O$ formation over the range of 250° to 450° C was less than 10 ppm.

EXAMPLE 12

Instead of ammonium molybdate used was ferric sulfate as a starting material. To a solution of ferric sulfate added was ammonia solution to precipitate ferric hydroxide. Ti/Cu/Fe catalysts having different compositions were prepared in the same manner as in Example 10 and gas treatment using the catalysts was conducted in the same manner as in Example 1. The results thereof are shown in Table 12.

Table 12

| Ti/Cu/Fe Molar Ratio Reaction Temperature (° C) | Left Column: $NH_3$ Decomposition Ratio(%); Right Column: $NO_x$ Formation Ratio (%) | | | | | | | | | | | | | |
|---|---|---|---|---|---|---|---|---|---|---|---|---|---|---|
| | 1/0.06/0.06 | | 1/0.11/0.01 | | 1/0.13/0.13 | | 1/0.07/0.35 | | 1/0.19/0.50 | | 1/0.50/0.50 | | 1/0/0.11 | |
| 250 | 3 | 0 | 0 | 0 | 5 | 0 | 3 | 0 | 3 | 0 | 3 | 0 | 0 | 0 |
| 300 | 55 | 0 | 51 | 0 | 66 | 0 | 64 | 0 | 63 | 0 | 62 | 0 | 8 | 0 |
| 350 | 94 | 1 | 93 | 1 | 100 | 1 | 98 | 1 | 97 | 1 | 95 | 1 | 52 | 1 |
| 400 | 100 | 2 | 100 | 9 | 100 | 3 | 100 | 3 | 100 | 8 | 100 | 14 | 100 | 2 |
| 450 | 100 | 9 | 100 | 30 | 100 | 10 | 100 | 10 | 100 | 22 | 100/39 | 100 | 7 | |

As is seen from Table 12, the Ti/Cu/Fe catalysts exhibit better catalytic activities than the Ti/Cu catalyst and Ti/Fe catalyst.

EXAMPLE 13

Instead of ammonium molybdate, ammonium metavanadate was used as a starting material to prepare Ti/Cu/V catalysts in the same manner as in Example 10. Gas treatment using the Ti/Cu/V catalysts was conducted in the same manner as in Example 1. The results thereof are shown in Table 13.

Table 13

| Ti/Cu/V Molar Ratio → | 1/ 0.06/0.06 | | 1/ 0.11/0.01 | | 1/ 0.12/0.06 | | 1/ 0.07/0.36 | | 1/ 0.17/0.50 | | 1/ 0.50/0.50 | | 1/ 0/0.11 | |
|---|---|---|---|---|---|---|---|---|---|---|---|---|---|---|
| Reaction Temperature (°C) | Left Column: NH$_3$ Decomposition Ratio (%); Right Column: NO$_x$ Formation Ratio(%) | | | | | | | | | | | | | |
| 250 | 3 | 0 | 0 | 0 | 5 | 0 | 4 | 0 | 3 | 0 | 3 | 0 | 0 | 0 |
| 300 | 59 | 0 | 53 | 0 | 70 | 0 | 68 | 0 | 65 | 0 | 61 | 0 | 0 | 0 |
| 350 | 90 | 1 | 90 | 1 | 91 | 1 | 91 | 1 | 90 | 1 | 90 | 1 | 30 | 1 |
| 400 | 100 | 11 | 100 | 11 | 100 | 14 | 100 | 14 | 100 | 15 | 100 | 17 | 88 | 10 |
| 450 | 100 | 33 | 100 | 32 | 100 | 42 | 100 | 41 | 100 | 44 | 100/48 | 100 | 29 | |

EXAMPLE 14

Instead of ammonium molybdate used was cerium nitrate as a starting material. Precipitate was obtained by adding ammonia solution to a cerium nitrate solution.

Ti/Cu/Ce catalysts were prepared in the same manner as in Example 10 and gas treatment was conducted in the same manner as in Example 1. The results thereof are shown in Table 14 below.

Table 14

| Ti/Cu/Ce Molar Ratio → | 1/ 0.06/0.06 | | 1/ 0.11/0.01 | | 1/ 0.13/0.13 | | 1/ 0.07/0.36 | | 1/ 0.17/0.50 | | 1/ 0.50/0.50 | | 1/ 0/0.11 | |
|---|---|---|---|---|---|---|---|---|---|---|---|---|---|---|
| Reaction Temperature (°C) | Left Column: NH$_3$ Decomposition Ratio(%); Right Column: NO$_x$ Formation Ratio (%) | | | | | | | | | | | | | |
| 250 | 2 | 0 | 0 | 0 | 5 | 0 | 4 | 0 | 3 | 0 | 3 | 0 | 0 | 0 |
| 300 | 55 | 0 | 52 | 0 | 69 | 0 | 67 | 0 | 63 | 0 | 61 | 0 | 3 | 0 |
| 350 | 89 | 0 | 89 | 0 | 91 | 1 | 90 | 0 | 90 | 1 | 90 | 2 | 21 | 0 |
| 400 | 100 | 3 | 100 | 10 | 100 | 13 | 100 | 4 | 100 | 10 | 100 | 14 | 60 | 0 |
| 450 | 100 | 15 | 100 | 31 | 100 | 39 | 100 | 16 | 100 | 23 | 100 | 41 | 94 | 1 |

EXAMPLE 15

In place of ammonium molybdate used was ammonium tunstate to obtain Ti/Cu/W catalysts in the same manner as in Example 10. Gas treatment was conducted in the same manner as in Example 1. The results thereof are shown in Table 15 below.

Table 15

| Ti/Cu/W Molar Ratio → | 1/ 0.06/0.06 | | 1/ 0.11/0.01 | | 1/ 0.13/0.13 | | 1/ 0.07/0.36 | | 1/ 0.17/0.50 | | 1/ 0.50/0.50 | | 1/ 0/0.11 | |
|---|---|---|---|---|---|---|---|---|---|---|---|---|---|---|
| Reaction Temperature (°C) | Left Column: NH$_3$ Decomposition Ratio(%); Right Column: NO$_x$ Formation Ratio(%) | | | | | | | | | | | | | |
| 250 | 2 | 0 | 0 | 0 | 4 | 0 | 3 | 0 | 2 | 0 | 2 | 0 | 0 | 0 |
| 300 | 53 | 0 | 49 | 0 | 68 | 0 | 66 | 0 | 61 | 0 | 60 | 0 | 0 | 0 |
| 350 | 86 | 0 | 89 | 1 | 91 | 1 | 90 | 0 | 89 | 0 | 89 | 0 | 8 | 0 |
| 400 | 100 | 2 | 100 | 12 | 100 | 11 | 100 | 3 | 100 | 9 | 100 | 13 | 40 | 0 |
| 450 | 100 | 11 | 100 | 36 | 100 | 36 | 100 | 14 | 100 | 22 | 100 | 44 | 73 | 1 |

EXAMPLE 16

In this example the space velocity was changed while other conditions were the same as in Example 10. The Ti/Cu/Mo catalyst was used in this example. The results are shown in Table 16 below.

Table 16

| SV, h$^{-1}$ | NH$_3$ Decomposition Ratio (%) | NO$_x$ Formation Ratio (%) |
|---|---|---|
| 5,000 | 100 | 3 |
| 10,000 | 100 | 1 |
| 30,000 | 99 | 0 |
| 100,000 | 86 | 0 |

From the results shown in Table 16 the Ti/Cu/mo catalysts can oxidize and decompose ammonia at high space velocities. Furthermore, it is apparent from the results shown in Tables 11 to 15 that the Ti/Cu/Mo (or W, V, Fe, Ce) catalysts exhibit better catalytic activities and lower NO$_x$ formation properties than the Ti/Cu catalysts.

What is claimed is:

1. A process for treating an exhaust gas consisting essentially of ammonia gas and oxygen gas as reactants, which comprises contacting the exhaust gas with a catalyst at a reaction temperature of about 250° to 450° C. and at a space velocity of 1,000 to 100,000 h$^{-1}$ thereby to oxidize and decompose the ammonia to nitrogen and water, said catalyst consisting essentially of 0.02 to 2 moles of copper oxide, up to 0.5 mole of an oxide of a metal component selected from the group consisting of molybdenum, tungsten, vanadium, iron, cerium and mixtures thereof, the balance being catalytically active titanium oxide having a surface area not smaller than 20 m$^2$/g, the molar amounts of the copper oxide and the oxide of the metal component being based on one mole of the titanium oxide.

2. A process according to claim 1, wherein the exhaust gas contains no nitrogen oxide.

3. A process according to claim 1, wherein the reaction temperature is from 300° to 400° C.

4. A process according to claim 1, wherein the titanium oxide in the catalyst is prepared by calcining a titanium compound at a temperature not higher than about 700° C.

5. A process according to claim 1, wherein the exhaust gas is contacted with the catalyst under a reaction pressure of from 1 atmosphere to about 10 kg/cm$^2$.

6. A process according to claim 1, wherein the catalyst is prepared by precalcining a mixture containing a titanium compound, a copper compound and optionally a compound of the metal component at a temperature lower than 700° C. and by calcining the precalcined mixture at a temperature lower than 700° C. to form oxides of the titanium, copper and metal component.

7. A process according to claim 1, wherein a starting material for the titanium oxide contained in the catalyst is a titanium oxide or titanium hydroxide.

8. A process according to claim 1, wherein a starting material for the titanium oxide in the catalyst is prepared by dissolving at least a part of titanium oxide in a concentrated sulfuric acid.

9. A process according to claim 1, wherein the catalyst consists of oxides of titanium and copper in the ratio of one mole of titanium to 0.02 to 2 moles of copper and the reaction temperature is from 300° to 400° C.

10. A process according to claim 1, wherein the catalyst consists essentially of oxides of titanium, copper and the metal component, the ratio thereof being one mole of titanium, 0.02 to 2 moles of copper, and 0.01 to 0.5 mole of the metal component.

11. A process according to claim 1, wherein the catalyst consists essentially of oxides of titanium, copper, and molybdenum in the ratio of 0.05 to 1 mole of copper and 0.05 to 0.5 mole of molybdenum per one mole of titanium.

12. A process according to claim 1 wherein the metal component is molybdenum.

13. A process according to claim 1, wherein the metal component is tungsten.

14. A process according to claim 1, wherein the metal component is vanadium.

15. A process according to claim 1 wherein the metal component is iron.

16. A process according to claim 1, wherein the metal component is cerium.

17. A process according to claim 1, wherein the titanium oxide contained in the catalyst is prepared from a titanium compound as a starting convertible into titanium oxide when heated.

18. A process according to claim 1, wherein the titanium oxide contained in the catalyst is prepared from titanium oxide as a starting material which has been at least partially dissolved in a concentrated sulfuric acid.

19. A process according to claim 1, wherein the titanium oxide contained in the catalyst is prepared from a titanium compound as a starting material convertible into titanium oxide when heated.

* * * * *